United States Patent [19]
Matsui et al.

[11] 3,924,537
[45] Dec. 9, 1975

[54] ELECTROMAGNETIC RAILS FOR DRIVING TRAINS BY THYRISTOR-CONTROLLED LINEAR MOTORS

[75] Inventors: Kazumi Matsui, Tokyo; Takashi Umemori, Musashino; Kenji Matsuura; Yoshikado Hosoda, both of Osaka; Tadashige Nishikawa, Tokyo; Makoto Tawara, Hiratsuka, all of Japan

[73] Assignees: Japanese National Railways, Tokyo; Sumitomo Electric Industries, Ltd., Osaka; Furukawa Electric Co., Ltd., Tokyo, all of Japan

[22] Filed: July 26, 1973

[21] Appl. No.: 383,017

[30] Foreign Application Priority Data

| | | |
|---|---|---|
| July 27, 1972 | Japan | 47-75391 |
| Aug. 25, 1972 | Japan | 47-85183 |
| Sept. 2, 1972 | Japan | 47-88113 |
| Sept. 2, 1972 | Japan | 47-88115 |
| Sept. 2, 1975 | Japan | 47-88117 |
| Sept. 2, 1972 | Japan | 47-88118 |
| Sept. 2, 1972 | Japan | 47-88119 |
| Aug. 25, 1972 | Japan | 47-99209 |
| Aug. 25, 1972 | Japan | 47-99211 |
| Sept. 22, 1972 | Japan | 47-110337 |
| Sept. 22, 1972 | Japan | 47-95336 |

[52] U.S. Cl. ............................ 104/148 LM; 310/13
[51] Int. Cl.² ........................................... B61B 13/08
[58] Field of Search... 104/148 LM, 148 MS, 148 SS; 310/12, 13; 318/135

[56] References Cited
UNITED STATES PATENTS

| | | | |
|---|---|---|---|
| 3,513,338 | 5/1970 | Poloujadoff | 104/148 LM |
| 3,768,417 | 10/1973 | Thornton et al. | 104/148 SS |
| 3,806,782 | 4/1974 | Matsui et al. | 104/148 LM |

*Primary Examiner*—M. Henson Wood, Jr.
*Assistant Examiner*—Reinhard J. Eisenzopf
*Attorney, Agent, or Firm*—Sughrue, Rothwell, Mion, Zinn & Macpeak

[57] ABSTRACT

Herein disclosed is an electromagnetic rail for driving a train by a thyristor-controlled linear motor including field structures mounted on the train and armature coils laid down on the ground and juxtaposed to said field structure for imparting a driving force and/or a floating force to the train through said field structure when an electric current flowing through said armature coil is commutated by the thyristor. The electromagnetic rail according to the present invention is characterized in that said armature coils comprises a plurality of undulating composite coil arrays, an insulator covering said composite coil arrays and a support secured to the ground for anchoring said composite coil arrays and said insulator at the ground, and in that all of said composite coil arrays and said insulator are moulded into a unitary structure. The present electromagnetic rail is advantageous in that the floating and driving forces can be created smoothly, and in that it can stand a high voltage built up therein and an ample current which is flowing through the armature coil.

13 Claims, 44 Drawing Figures

CURRENT ⊗    CURRENT ⊙

⟹ MAGNETIC FLUX    ⟸ MAGNETIC FLUX

ELECTROMAGNETIC RAILS FOR DRIVING TRAINS BY THYRISTOR-CONTROLLED LINEAR MOTORS

BACKGROUND OF THE INVENTION

1. Field of the Invention

The present invention relates to an electromagnetic rail for driving the train by a thyristor-controlled linear motor.

2. Description of the Prior Art

Ordinary trains are known to be supported by wheels rolling on rails and driven by utilizing the adhesion between the rails and the wheels which are rotated by the torque transmitted from electric motors or the like prime mover. With such powering system, however, a running speed of higher than 300 km/hour is difficult to obtain due to decrease in the adhesive power. For this reason, a method of directly driving the trains by induction linear motors has been proposed for use in such high speed railways. However, many problems such as low power factor, low efficiency, edge effect and the like must be solved before practical use of this system. The running of conventional trains is generally controlled by drivers who judge the operating conditions in accordance with information given by various meters on the train or signals situated along the railroad. In recently developed automatic running system, the above judgements and controls which have been performed by the drivers themselves are taken over by an automatic control or running system comprising an electric computer. According to this system, however, it is necessary to mount computers on respective trains and to provide a complicated information transmission system between respective trains and a control center on the ground, thus requiring an extremely large cost of installation for whole railway system.

LINEAR MOTOR SYSTEM OF THE PRESENT INVENTION

A thyristor-controlled linear motor system is now being investigated as the most promising driving system for automatic control of high speed railway vehicles. The thyristor-controlled linear motor system of this invention employs a linear motor of the type set forth in U.S. Pat. No. 3,771,033, assigned to the common assignee. FIG. 1 of the accompanying drawings shows an example of an electrical system and FIG. 2 is a perspective view of the ground coils and the magnetic field structure mounted on the vehicle.

As shown in FIG. 1, the electrical system comprises a plurality of groups of armature coils 1 - $a$, 1 - $b$, 1 - $c$ and 1 - $d$. Coils in each group are connected in series, and the groups of the coils are juxtaposed with the coils of one group displaced from the coils of another group by a predetermined phase angle. As shown in FIG. 2, moreover, the entire coil assembly is covered with a protective material and secured to a suitable support on the ground with respective coil planes being held vertical. For the sake of brevity, the ground coil assembly constructed as above described will be referred to as an "electromagnetic rail".

A field structure 16 mounted on the vehicle or train includes an air gap extending in the longitudinal direction or in the running direction of the vehicle and adapted to receive therein the coil assembly with suitable gaps in between. The field structure 16 is provided with an exciting coil to create a magnetic flux B which interlinks or crosses the armature coil in a direction normal to the plane thereof. The electric currents flowing through the groups of armature coils are suitably reversed, switched, turn on or off by means of a frequency converter J in the form of known cyclo-converter, inverter, chopper, flip-flop circuit or the like, under control of a control signal I synchronized with the position of the field structure 16 mounted on the vehicle or a control signal I determined in accordance with a predetermined pattern, so that the field structure 16 and hence the vehicle is propelled synchronously with the switching of the coil currents. Further, a thyristor-controlled linear motor system is also under investigation employing a linear motor of the type set forth in U.S. Pat. 3,771,033 in which the magnetic flux B of the field structure 16 links with the lower sides of the armature coils so as to produce the floating force.

When, in this instance, it is intended to use the thyristor-controlled linear motor in an ultra high speed train, then the required amounts of the floating force and the driving force will respectively reach 30 to 40 tons and about 5 tones per car. In order to obtain such forces in the case where natural conducting coils are employed as the field structure on the car, about $10^5$ AT (ampere-turns) are required for the grounded armature coils, since the field flux density is of the order of 8 KG. Since, on the other hand, the field structure will run or proceed at a high speed, the counter electromotive force and hence the commutation surge induced in the armature coils will amount to high levels, so that a high voltage exceeding 10 KV will also be induced.

SUMMARY OF THE INVENTION

It is, therefore, an object of the present invention to provide an electromagnetic rail for driving a train by a thyristor-controlled linear motor, in which floating and driving forces to be imparted to the train are smoothly created, and which can stand a high voltage built up therein and an ample current which is flowing therethrough.

Another object of the present invention is to provide an electromagnetic rail so designed as to facilitate its manufacturing, installation, maintenance and inspection.

Still another object of the invention is to provide an electromagnetic rail having such a function as to give an additional floating force to the train, to prevent the train from falling rapidly in case of sudden current stoppage, and to afford the train a braking force.

A further object is to provide an electromagnetic rail which is capable of efficiently dissipating the heat generated in the armature coil so as to prevent the thermal deterioration of the particular rail.

According to a primary aspect of the present invention, an electromagnetic rail for driving a train by a thyristor-controlled linear motor, which includes a field structure mounted on the train and armature coils laid down on the ground and juxtaposed to said field structure for imparting a driving force and/or a floating force to the train through said field structure when an electric current flowing through said armature coil is commutated by the thyristor, is characterized in that said armature coils comprise a plurality of undulating composite coil arrays, an insulator covering said composite coil arrays and a support secured to the ground for anchoring said composite coil arrays and said insulator to the ground, and in that all of said composite coil arrays and said insulator are moulded into a unitary structure.

BRIEF DESCRIPTION OF THE DRAWINGS

Other objects and advantages of the present invention will be apparent from the following description taken in conjunction with the accompanying drawings, in which.

DESCRIPTION OF THE PREFERRED EMBODIMENTS

Figure 1:
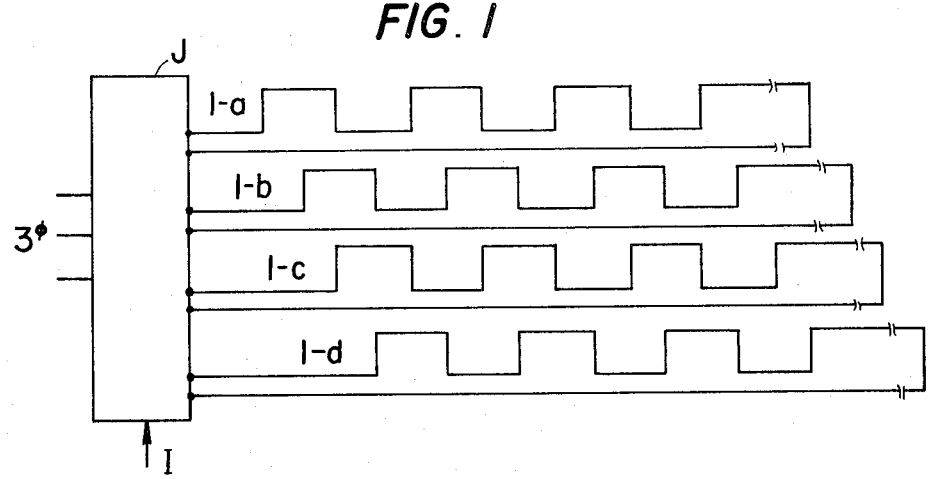
FIG. 1 is an explanatory view showing the basic construction arrangement of a thyristor-controlled linear motor.
Figure 2:
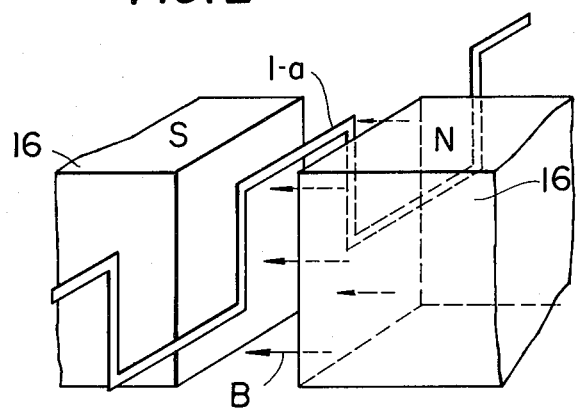
FIG. 2 is a perspective view showing the operating principles of the thyristor-controlled linear motor of FIG. 1.
Figure 3A:
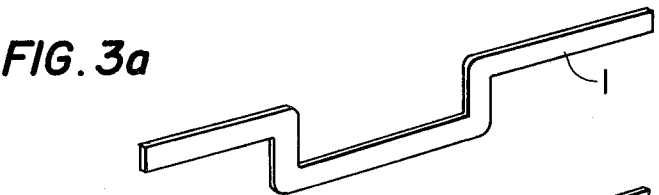
FIGS. 3(a) and 3(b) are perspective views showing an undulating coil for use in the electromagnetic rail according to the invention, of which a rectangular shape is shown in FIG. 3(a) whereas a trapezoid shape is shown in FIG. 3(b)
Figure 3B:
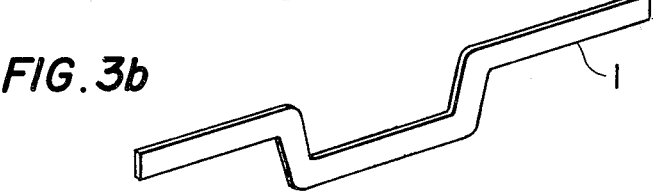

Referring now to FIGS. 3a and 3b indicated at reference numeral 1 is a coil conductor which is used in an undulating armature coil of an electromagnetic rail according to the present invention. FIGS. 3(a) and 3(b) show a general shape of the coil conductor 1, of which a rectangular shape is shown in FIG. 3(a) whereas a trapezoid shape is shown in FIG. 3(b). The wave shape to be employed in the present undulating armature coil should not be limited to the above two, namely, rectangular and trapezoid shapes, but may find a variety of other shapes such as semicircular, triangular, polygonal, sinsoidal or other modified wave form with a equidistant pitch.

The pitch and height of the undulating armature coil under consideration may be determined to have suitable values in view of the objects and applications of the electromagnetic rail, the driving force and the floating force required of the train, the dimensions of the field structure and the change-over frequencies of the electromagnetic rail.

Figure 4:
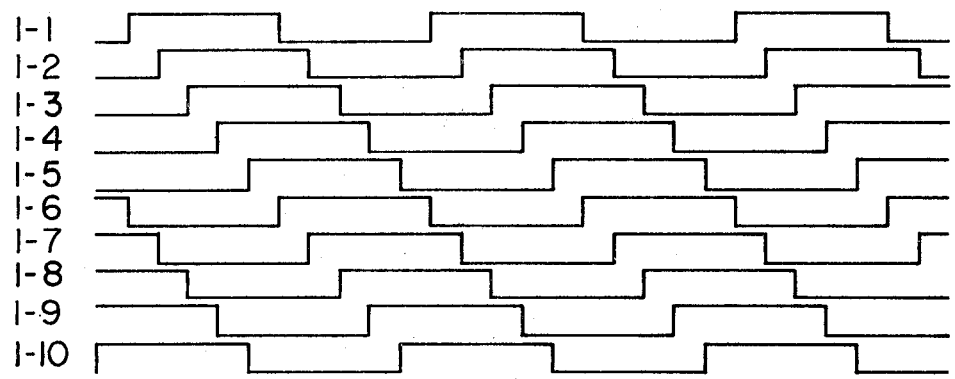
FIG. 4 is an explanatory view showing the arrangement of the undulating coils for the present electromagnetic rail, which are divided into ten.

The electromagnetic rail for the thyristor-controlled linear motor driven train includes, as shown in FIG. 4, undulating armature coils which are composed of a plurality of juxtaposed rows of composite undulating coil arrays. These composite coil arrays are, for example, ten in number, and are arranged in the proceeding direction of the particular train or in the longitudinal direction of the rail, being a predetermined phase shifted from each other. This arrangement is necessary for smoothly generating the above driving force.

Since an armature coil of undulating shape has a minimum number of turns, that is, just one turn, the resultant electromotive force will accordingly assume a minimum value. Since, on the other hand, the inductance of the armature coil is also at a low level, the commutation surge will accordingly be small and the obtainable volatage will also become minimum. Assuming, therefore, that a length of one electromagnetic rail feed section be 500m, the resultant voltage will be 10 KV for the undulating armature coils, and 20 KV for the overlapped two-turn coils.

Figure 5:
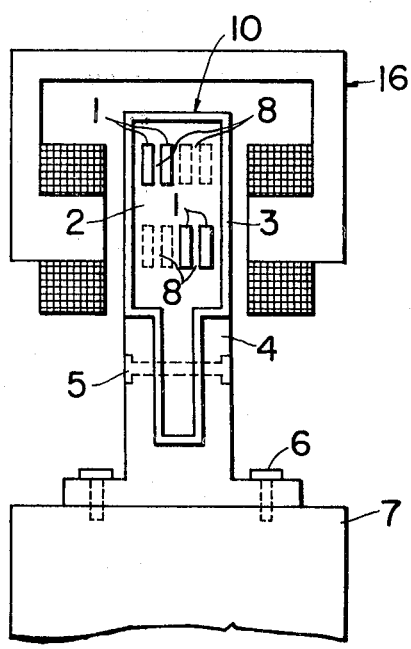
FIGS. 5 to 7 are cross-sectional views showing the basic construction arrangements of the present electromagnetic rail.

In FIG. 5, a first embodiment of the present invention is cross-sectionally shown, in which the armature coils are divided into four rows. Indicated at reference numeral 1 are undulating armature coil conductors of copper or aluminum, of which two lower right-hand rows and two upper left-hand rows are shown at their cross-sections. An electric insulator 2, which is made of epoxy resin, polyester resin or the like, fills the space between the armature coil conductors 1. This insulator 2 also acts to provide electrical insulation for a coil inter-layer portion 8, as will be easily understood. Designated at numeral 3 is a non-conductive covering which is made of, for example, fiber reinforced plastics (F.R.P). This non-conductive covering 3 covers the coil conductors and the insulator 2, and is moulded altogether into a unitary structure. The armature coil portion is, on the other hand, secured mechanically to a guide way 7 through a stationary support 4 which is made of non-magnetic metal such as aluminum or stainless steel. Reference numerals 5 and 6 indicate fastening bolt and securing bolts, respectively. Indicated at reference numeral 16 is a field structure to be mounted on the train. This field structure 16 is arranged to stride an electromagnetic rail 10 so as to produce magnetic fluxes across the armature coil. As easily understood, the insulation of the coil inter-layer portion 8 can be performed between flat coil conductors 1, so that the construction thereof can be remarkably facilitated.

As above described, the present invention is directed to an electromagnetic rail for use with a thyristor-controlled linear motor driven ultra high speed train, which rail is characterized in that all of a plurality of undulating armature coils, a covering for covering the armature coils and a support are moulded into a unitary structure, and in that the resultant unitary structure is secured to the ground through the support. Therefore, the electromagnetic rail according to the present invention should be appreciated in the reduction in the generated voltage, in feasibility of insulating construction and in improved excellency in the insulating faculty.

Figure 6:
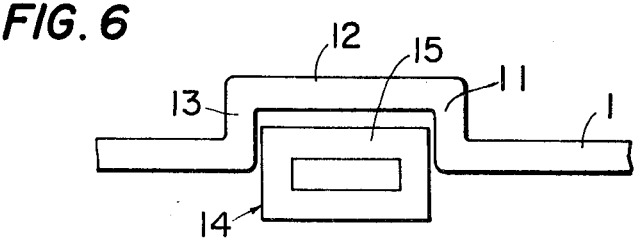

Turning now to FIG. 6, another embodiment of the present invention is shown at its side elevation. There is shown an induction coil 14 which is disposed in a lower space surrounded by the three sides 11, 12 and 13 of the undulating armature coil 1. The induction coil 14 is manufactured into a coil assembly by covering with a protective coating a rectangular short circuited coil which has a coil plane substantially flush or parallel with the plane of the armature coil. The induction coil 14 can perform the following functions. While the train is running in a floating condition at an ultra high speed by the action of the floating force which is generated by the cooperation between the armature coil and the field structure on the train, it may happen that an emergency occurs to cause interruption of an armature current flowing through the armature coil. If such emergency should take place, the running train body would fall down quickly, with resultant serious harm to the passengers, to the train body and to the electromagnetic rail. If, in this instance, the induction coil 14 is provided as in FIG. 6, a portion of the magnetic flux created by the field structure on the running train will link the induction coil 14 to induce therein an induction current, which will create the floating and braking forces to the train with the aid of the electromagnetic action of the magnetic flux of the field structure. Thus, the floating force created prevents quick fall of the train which is caused by interruption of the armature currentt flowing through the armature coil while the train is floating during the high speed running. As a result, the braking force will decelerate the train, which can then be safely grounded.

Figure 7:
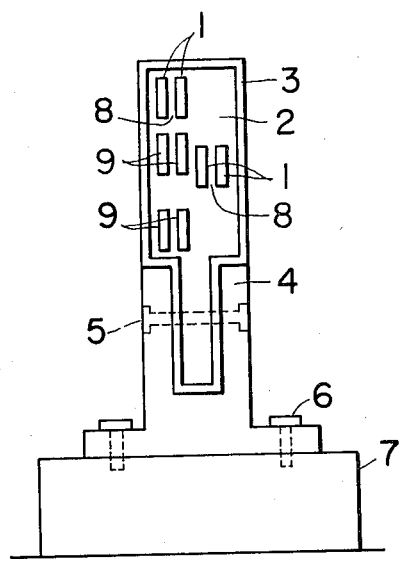

Turning now to FIG. 7, the present electromagnetic rail is shown, into which the induction coil structure of FIG. 6 is incorporated. In this figure, like reference numerals indicate like parts or elements of FIG. 6, and as such the repeated description thereof will be omitted here. Reference numeral 9 will indicate coil conductors for the induction coil.

Based on the two embodiments of FIGS. 5 and 7, we, the inventors, have invented a variety of modifications of the present electromagnetic rails, which will be described hereinbelow. In this connection, it should be noted that these modifications can be suitably combined in accordance with the desired purposes.

Reverting now to FIG. 4, the present electromagnetic rail for the thyristor-controlled linear motor driven train is shown to have its undulating armature coil divided into ten coil arrays. If, in this instance, the five coil arrays among ten coil arrays are supplied with an electric current of 14,000 A per array which is controlled by the thyristor, and if the current supply is commutated to obtain a continuous driving force in a manner that the electric current is commutated from the coil arrays No. 1 — 1, 1 - 2, 1 - 3, 1 - 4 and 1 - 5 to the coil arrays No. 1 - 2, 1 - 3, 1 - 4, 1 - 5 and 1 - 6, the driving force obtainable will have an average value of 3.6 tons per car and the floating force will have an average value of 20.4 tons per car, if the field structure on the train has a magnetic flux density of 8 KG and the number of the field structure is four per car. In order to obtain a magnetic flux desity of 8 KG, however, the required weight of each field structure will be 4.3 tons, which will be 17.2 tons per car, even if the field structure is composed of an aluminum coil. This means that the total weight of the car becomes about 30 tons which will exceeds the obtainable floating force. Due to the commutation of the electric current, moreover, pulsation of the floating force will take place with an amplitude of about 20% of its average value.

Figure 8:
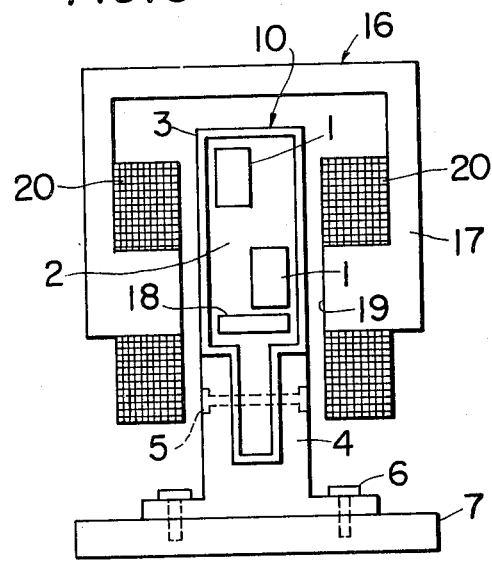
FIGS. 8 and 9 are similar to FIG. 5 but show modifications of the present invention.
Figure 9:
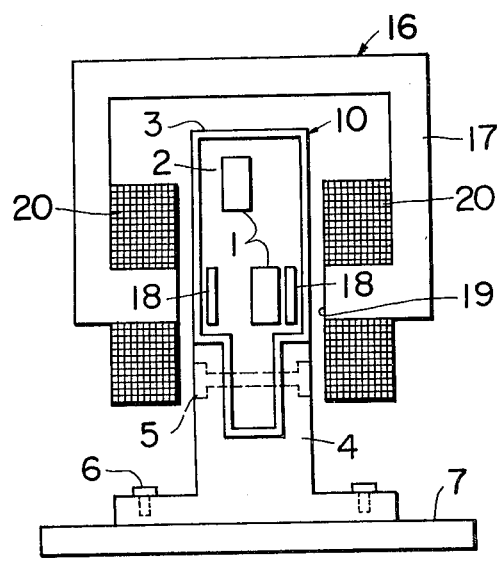

In order partly to compensate the deficiency in the floating force and partly to minimize the pulsation of the same, a linear conductor 18 is provided in the present electromagnetic rail in a manner to cross the magnetic flux of the field structure, as shown in FIGS. 8 and 9.

Reference will now be made to FIG. 8, in which the linear conductor to be mounted in the present electromagnetic rail is contributive merely to the floating force. In this figure, like numerals will indicate counterparts of the foregoing.

Reference numerals 10, 16, 17 and 20 will indicate, respectively, the electromagnetic rail laid on the ground, the field structure mounted in the train, an iron core for the field structure 16, and field structure windings made of copper or aluminum.

Under the operating conditions as previously described, for example, the current density for the undulating armature coil of copper is $10A/mm^2$ in consideration of electric supply time period with the thyristor commutation and the length of one electromagnetic rail feed section, but the current density for the linear conductor 18 whould be 5 A/mm² since it is not subject to the thyristor commutation. If, in this instance, the conductor 18 has a rectangular cross-section of 150 mm × 30 mm, the possible electric supply will reach 22,500 A, thus creating a floating force of 13 tons. If, moreover, two magnetic pole ends are added to face the electromagnetic rail 10, then the additional weight to the field structure will be about 3 tons, so that the total weight of the car will be 33 tons per car whereas the total floating force will be 33.4 tons per car. This means that the resultant floating force is sufficient for the total weight of the car. On the other hand, it is found that the pulsation or fluctuation of the floating force is so reduced as to have an amplitude of about 12% of the average value. This should be appreciated in the stability in the running condition of the train.

FIG. 9 shows another embodiment of the present invention, in which the linear conductor is mounted. In this embodiment, the linear conductor 18 is disposed at both sides of the lower portion of the armature coil. In this instance, the surplus floating force is also obtained, as has been described in connection with FIG. 8.

In order to control the proceeding speed of the field structure, the frequency of the flowing current and/or the frequency of the commutation should be controlled. And, in order to control the respective trains at respective proceeding points, a power source should be provided for the respective feed section. This power source includes a thyristor as a circuit element and has a frequency converting function and/or a commutating function. In each of the feed section, moreover, a feed line should be provided as a return passage for the undulating armature coil acting as a feed passage. In the electromagnetic rail according to the present invention, at least one group including two rows of undulating armature coil is arranged in the proceeding direction of the field structure, and the two rows are respectively used as the feed passage and as the return passage, between which one coil pitch interval exists to create the driving force in the field structure and to dispense with an extra feed line as the return passage. In this way, highly efficient and economical electromagnetic rails can be obtained according to the present invention.

Figure 10:
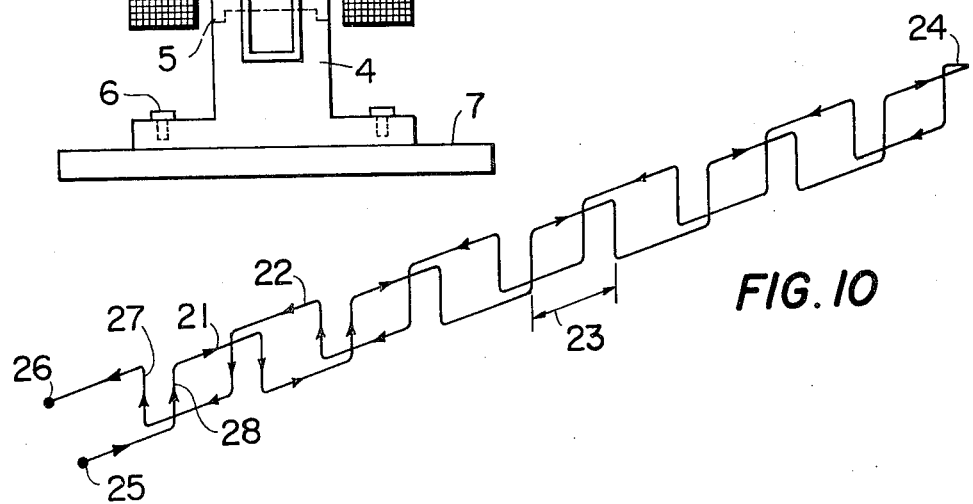
FIG. 10 is a perspective view showing the directions of the electric currents which flow alternately through the two rows of the undulating coils.

Another embodiment of the present invention will be described with reference to FIG. 10, in which the directions of the electric current flowing through the two rows of the undulating coils are persepectively shown in the case where the current has an alternate nature. In FIG. 10, designated at reference numerals 21 and 22 are two rows of the undulating armature coils, which are dislocated or phase shifted from each other at one coil pitch interval 23 in the longitudinal direction. These armature coils 21 and 22 are electrically connected with each other at a distant end 24 of the feed section. With these arrangements, let it be assumed that the terminal 25 be at a higher potential than the terminal 26, the current will flow in the direction of the arrows of the drawing, so that the current flowing through the adjoining sides 27 and 28 of the undulating armature coils 21 and 22 is in the same direction, thus creating effectively a magnetic field. In this instance, however, if the terminals 25 and 26 are connected with a power source having the frequency converting function, then the feed line from the power source to the distant end 24 of the feed section requires special consideration.

Figure 11A:
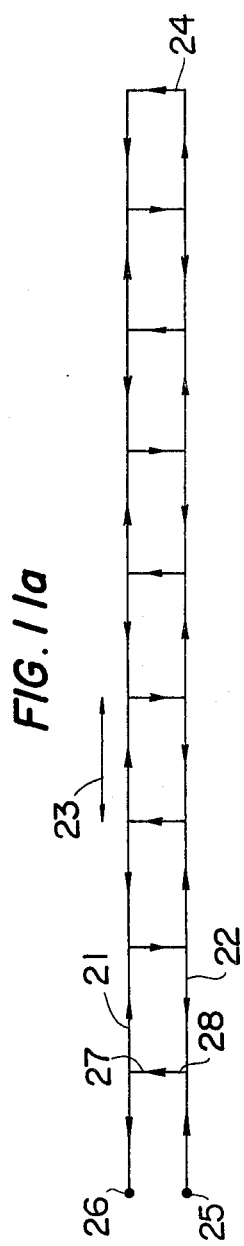
FIGS. 11(a) is a diagram showing the directions of the electric currents of FIG. 10.
Figure 11B:
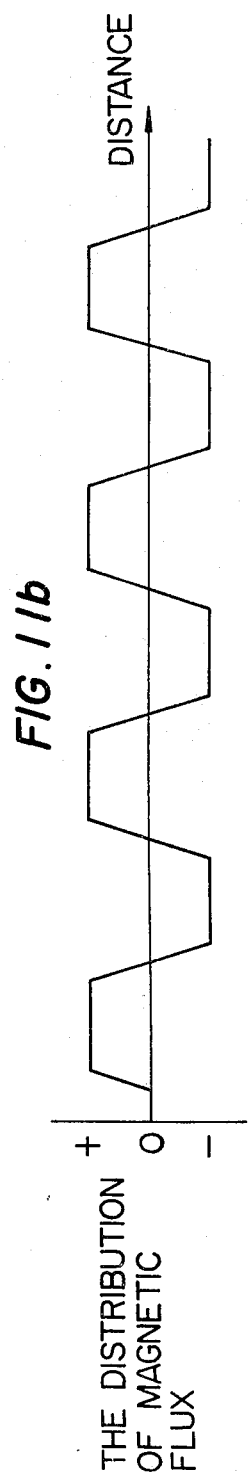
FIGS. 11(b and 11(c) are graphical presentations showing the spacial distributions of the magnetic flux obtained from the currents of FIG. 10.
Figure 11C:
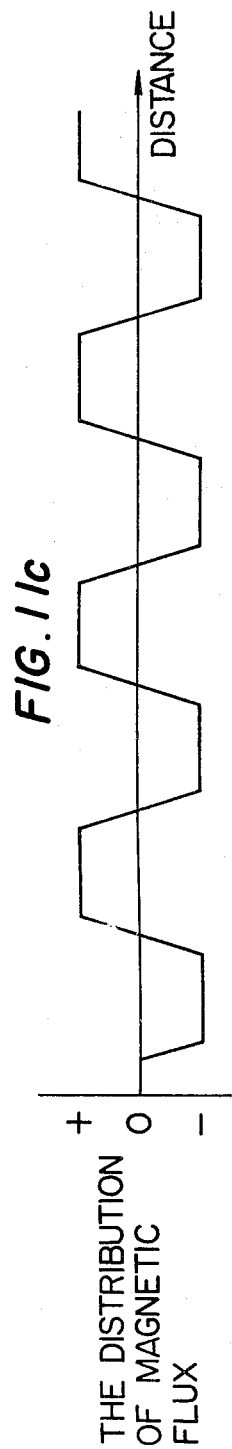

Spacial distribution of the magnetic flux of the armature coil having similar construction as that of FIG. 10 is shown in FIG. 11a, which is the side elevation showing the directions of the current flowing through the armature coil. FIG. 11b shows the spacial distribution of the magnetic flux obtained from the current of FIG. 11a and FIG. 11c shows the particular distribution given half-cycle later of the alternate current of FIG. 11a. The magnitude of the magnetic flux as shown in FIG. 11b and FIG. 11c has its positive level corresponding to the current towards the face of the drawing. Comparing FIG. 11b and FIG. 11c it will be understood that the magnetic flux of FIG. 11c is advanced by one coil pitch ahead of FIG. 11b. In this way, a proceeding magnetic field occurs for imparting the driving force to the field structure on the train, by supplying an alternate current to the armature coil having the above construction.

The present invention can also be exemplified in such a manner that the $n$ th group of the two rows of the undulating armature coils of FIG. 10 is arranged to be displaced from each other in the longitudinal direction by $1/n$ coil pitch interval, and that an electric current of one polarity is succeedingly supplied to each of the groups so as to create the proceeding magnetic field.

Figure 12A:
FIGS. 12(a) is a top plan view showing the arrangement of the two rows of the undulating coils of FIG. 10.
Figure 12B:
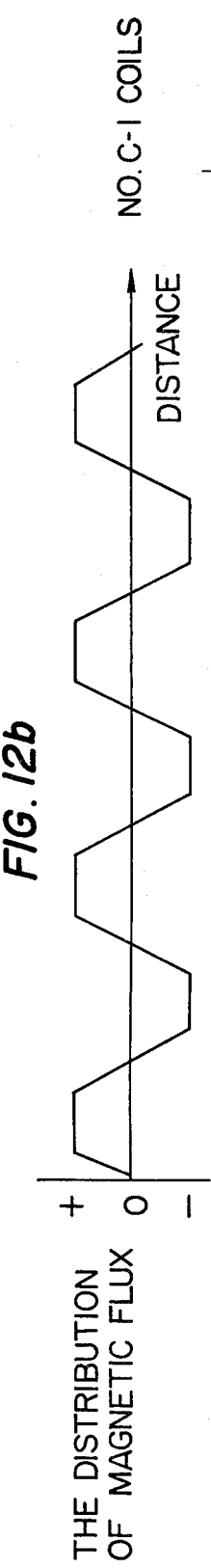
FIGS. 12(b) and 12(c) are graphical presentations showing the spacial distributions of the magnetic flux of FIG. 12(a)
Figure 12C:
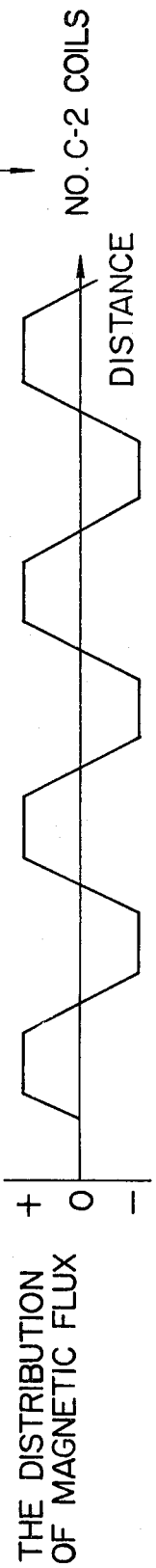

Turning now to FIGS. 12a, 12b, and 12c, spacial distribution of the magnetic flux is shown which is obtained when the two groups of the two rows of the undulating armature coils of FIG. 10 are arranged. FIG. 12a is a top plan view showing the arrangement of the armature coils, FIG. 12b shows the spacial distribution with the No. C - 1 coils of FIG. 12a being energized, and FIG. 12c shows the spacial distribution with the No. C - 2 being energized. As is apparent from the comparison between FIG. 12b and FIG. 12c the magnetic field of FIG. 12c is advanced spacially by ½ coil pitch. In this way, commutated current is consecutively supplied to each of the groups of the undulating armature coils, so that the moving magnetic field imparts the driving force to the field structure. In either event, the feed line from the power source to the distant end of the feed section can be dispensed with just as the embodiment of FIG. 10.

In order to make the obtainable driving force as continuous and smooth as possible, the electromagnetic rail of the present invention includes a plurality of undulating armature coils which are displaced from each other in the proceeding direction by the length determined by twice the coil pitch divided by a divisional number. Since, in this instance, the current is commutated and succeedingly supplied to the armature coils which are divided and structurally phase shifted from each other, the length of that lower portion of the respective armature coils, through which the current is flowing across the magnetic flux of the field structure, becomes so unbalanced that the floating force components imparted to the both side poles of the field structure are accordingly unbalanced to create undesirable rotational force, thereby deteriorating the stability of running of the train.

In order to obviate the above difficulty, another modification provides an improved construction, in which two parallel electromagnetic rails having the undulating armature coils are laid down on the ground. One of the two electromagnetic rails is used as the feed passage of the current, whereas the other is used as the return passage, so that the undesirable rotational forces resulting from the two rails will compensate each other.

This modification should also be appreciated in that the present electromagnetic rail can be dispensed with an extra feed line for the return passage. In this instance, the two electromagnetic rails may be divided internally into a plurality of undulating armature coils, respectively. In this construction, moreover, the corresponding armature coils of the two rails will act as the supply passage and the return passage, respectively.

Figure 13:
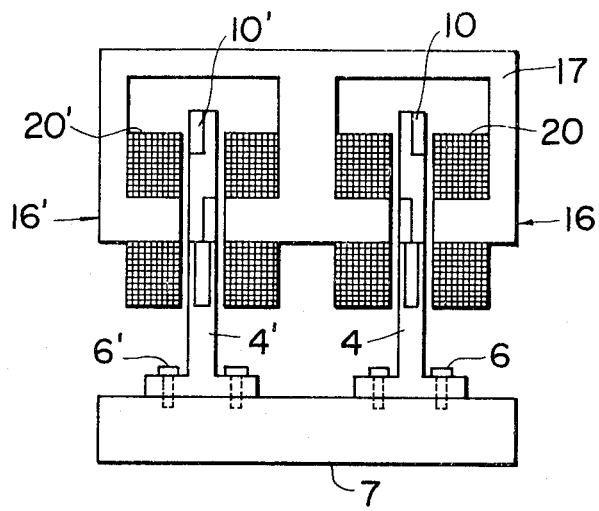
FIG. 13 is similar to FIG. 5 but shows another modification of the present invention.

This modified concept will be described with reference to FIG. 13, in which like numerals indicate counterparts of FIG. 8. Reference numerals 10 and 10' indicate two similar electromagnetic rails which are arranged in parallel with each other. Two field structures 16 and 16', which stride the rails 10 and 10' respectively, are constructed into a unitary structure, as shown. With these construction arrangements, an electric current is supplied using one of the rails as a supply passage and the other as a return passage. And, the magnetic fields of the field structures 16 and 16' are directed in the directions of the arrows, namely, in the opposite directions, as seen from the lower portion of FIG. 13. Thus, the floating force and the driving forces of the same direction are given simultaneously to the structures 16 and 16'. In this instance, the undulating armature coils in the rails 10 and 10' may have the same pitch interval.

With these construction arrangements, therefore, the floating forces imparted to the field structures 16 and 16' have the same intensity, thus reducing the undesirable rotational force to zero. This modification should also be appreciated in that a feed line for the return passage can be dispensed with since one rail is used as the supply passage and the other is used as the return passage. Moreover, since the field structures 16 and 16' are moulded into a unitary structure, the rotational force will disappear, and another rotational force, if any, coming from unbalanced loading will also be minimized, so that running stability of the train will be highly increased.

Figure 14A:
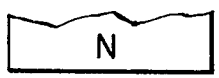
FIG. 14(a) is a base plan view showing the arrangement of the lower sides of the undulating coils where the armature coils divided into four rows.
Figure 14B:
FIGS. 14(b), 14(c), 14(d) and 14(e) are explanatory views showing the moment of rotation with respect to the field structure.
Figure 14C:
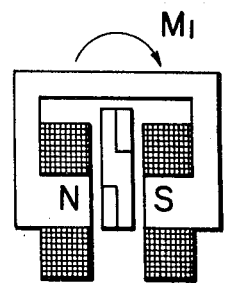

Reference will now be made to FIGS. 14a, 14b, 14c, 14d and 14e, in which the armature coil in the single electromagnetic rail is divided into four portions. FIG. 14a, shows a horizontal arrangement of the lower portion of each of the armature coils, and FIG. 14b and FIG. 14c show, respectively, the relationship with the field structure and the momentum of rotation seen in cross-section, in the case where the armature coil of the arrangement of FIG. 14a is supplied with commutated current. In FIG. 14b, the lower, portion of the respective armature coils, which is interposed between the N pole and S pole of the field structure for passing the current therethrough is shown by solid lines which have asymmetrical lengths between the above two poles with respect to the crossing passages of the flux. As a result, the floating forces imparted to the N pole and S pole of the field structure are different to create momentum of rotation in the arrow $M_1$, as shown in FIG. 14c. As the field structure proceeds, this momentum of rotation will alternately be produced to deteriorate the running stability of the train. Here, the broken lines of FIG. 14b indicate the lower portions of the armature coils which are non-conductive.

Figure 14D:
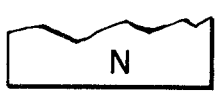
Figure 14E:
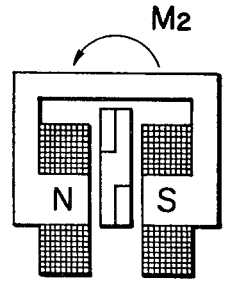

FIGS. 14d and 14e respectively show the relationship with the field structure and the momentum of rotation in cross-section, in the case where the armature coils of different arrangement are supplied with commutated current. In this instance, the arrangement of the lower portions of the respective armature coils is also asymmetric, so that the floating forces to the N and S poles are so different as to create the moments of rotation. This moments of rotation is shown by the arrow $M_2$ in FIG. 14c and will alternately appear during the running operation of the train.

In order to prevent the alternate momentum of rotation from being created in the field structure and accordingly to improve the running stability of the train, the present invention proposes a modified concept, in which a plurality of armature coils are arranged in the electromagnetic rail in a symmetrical manner with respect to the longitudinal direction of the rail or in the proceeding direction of the train. That is, a plurality of armature coils are further devided into two portions so that the length of the lower portions of each armature coil being supplied with a current across the magnetic flux of the field structure may be symmetrical. And they may be arranged in a symmetrical manner with respect to the proceeding direction of the train and electrically connected in parallel with each other. This concept will be described in conjunction with FIG. 15.

Figure 15:
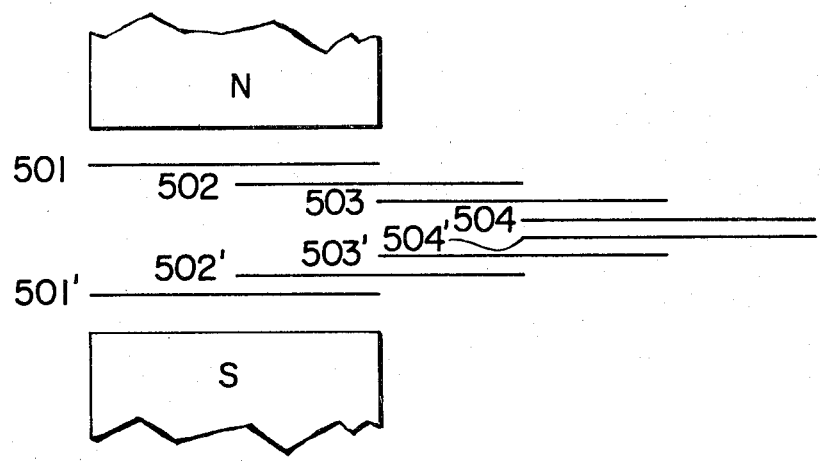
FIG. 15 is an explanatory view showing a horizontal arrangement of the armature coils between the field structure.

In FIG. 15, the horizontal arrangement of the divided armature coils is shown to present their lower portions which are interposed between the magnetic poles of the field structure. As shown, the ground coil is divided into eight armature coils 501, 502, 503, 504, 501', 502', 503' and 504', and each pair of the armature coils, 501 and 501', 502 and 502', 503 and 503', amd 504 and 504' is arranged to have their lower ends parallel and symmetrical, and are electrically connected in parallel with each other. When an electric current is supplied to the above ground coil, then, for example, two pairs of the armature coils 501 and 501', and 502 and 502' are supplied with the current. Thus, the lower ends of the above pairs have symmetrical length across the magnetic flux of the field structure. These symmetrical relationships between each pair will not be changed with the advance of the field structure. As a result, the floating forces to the two poles of the field structure will also be symmetrical to eliminate creation of the alternate moments of rotation, which might deteriorate the running stability of the train. Since, moreover, reaction to be imparted to the electromagnetic rail also becomes symmetric, the rail will not be subject to the resultant bending moment, so that it can be free from possible damage.

In a thyristor-controlled linear motor driven train, on the other hand, the train body itself should float during the running operation, and such being the case the weight of the train body is desired to be as small as possible in respect of feasibility of the floating operation and of acceleration and deceleration operation. For this purpose, it is considered most effective to reduce the weight of the field structure which is to be mounted on the train body. Since, in this regard, the field structure is arranged to stride the electromagnetic rail, the thickness of the rail is required to be small so as to lighten the field structure, that is, to make the gap between the two poles of the particular structure narrower. In conjunction with the thickness of the electromagnetic rail, ti should be kept in mind as a major problem that the particular thickness will necessarily be increased by the partial overlapping of the multiple divided undulating armature coils, as has been described in the beforehand. In view of this problem, we, the inventors, have found that the following construction will eliminate the particular problem. In this novel construction, the electromagnetic rail includes a plurality of composite coil arrays, in which two rows of undulating armature coils with a conductor pitch equal to coil pitch have their vertical conductor sides overlapped one over the other. More specifically, each of the undulating armature coils is constructed to have its vertical sides widened to have their thickness smaller than ½ of that of their horizontal sides. Each of the vertical sides of one row is secured to a respective vertical side of the armature coil of another row through an electrically insulating material. Without undesirably increasing the current density of the armature coil, therefore, a floating force and a driving force at a similar level of an electromagnetic rail with the same number of rows of the composite coil arrays can be obtained, although the total thickness of the present rail can be reduced to ½ of that of the non-modified rail.

Figure 16:
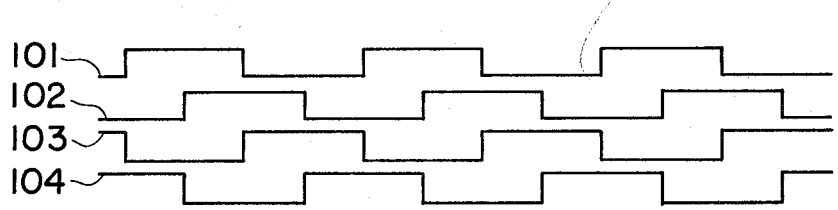
FIG. 16 is an expanded view showing the four rows of the armature coils.
Figure 17:
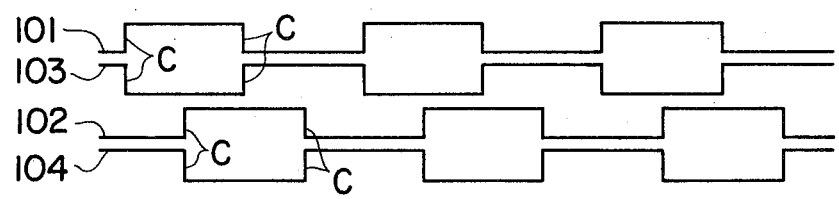
FIG. 17 is similar to FIG. 16 but shows a modified arrangement of the armature coils.
Figure 18A:
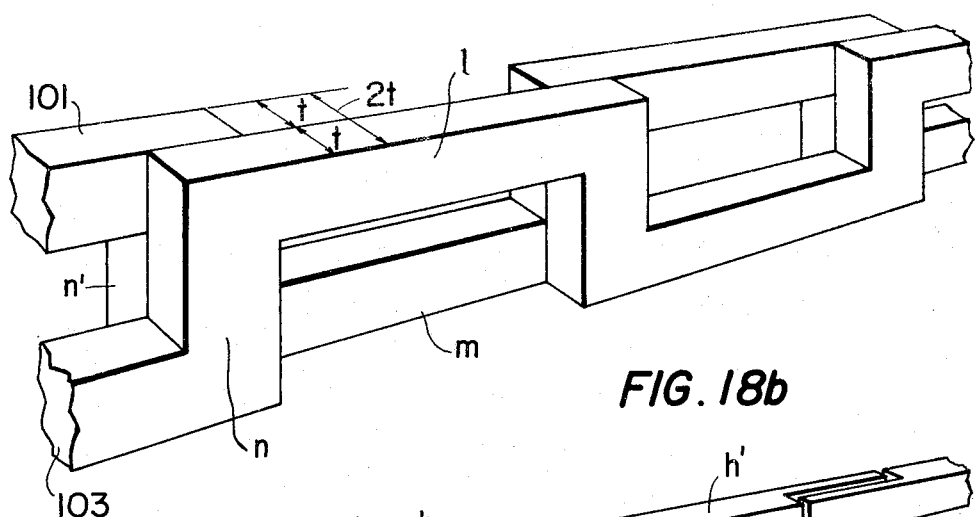
FIG. 18(a) is a perspective view showing the assembly of the armature coils of FIG. 17.

Reference will be made to FIG. 16, in which the conventional composite coil arrays constituting into the electromagnetic rail is shown in an exploded manner. For illustrative purposes only, the composite coil array includes four rows of the undulating armature coils, as shown. The undulating coils 101, 102, 103 and 104 thus arranged are overlapped, one on another in a manner to have their coil planes vertical, thus overlapping one portion of the respective sides of the respective coil on that of the coil of the adjoining row. If, in this instance, the coils 101 and 103, and 102 and 104 are respectively combined for arrangement, then the coil pairs 101 and 103, and 102 and 104 respectively have their vertical sides C overlying one on another when their coil rows are vertically overlapped. The perspective view of this arrangment will be presented in FIG. 18(a). As will be apparent from FIG. 18(a), since the two rows of the undulating coils 101 and 103 have their undulating coil elements ($e$) and ($m$) overlapped one on the other at their respective vertical sides ($n$) and ($n'$), the total thickness of the composite coil array will be two times the thickness ($t$) of the respective coil elements ($l$) and ($m$).

Figure 18B:
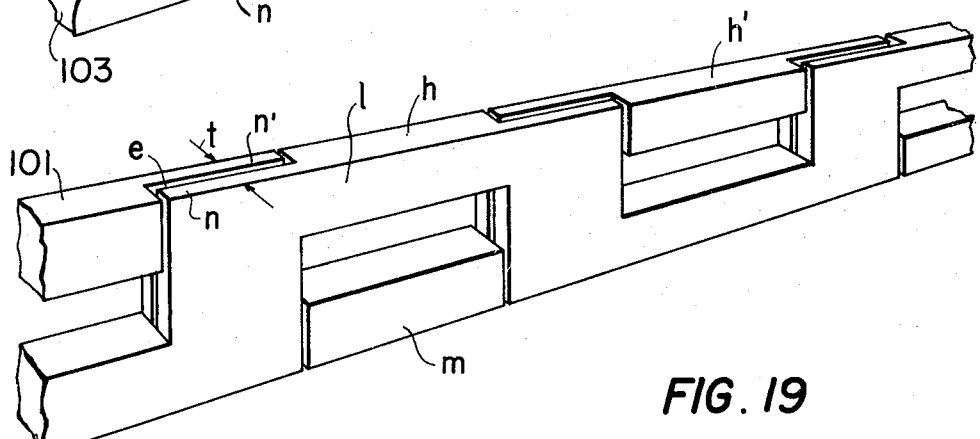
FIG. 18(b) similar to FIG. 18(a) but shows a modification of the present invention.

This total thickness of the composite coil array can be reduced in accordance with the afore-mentioned proposal, as will be described with reference to FIG. 18(b). As shown, the composite coil array includes two rows of the undulating armature coils 101 and 103 which are respectivvely composed of the undulating coil elements ($l$) and ($n'$). As has been described, the vertical sides ($n$) and ($m'$) of these coil elements ($l$) and ($m$) have a thickness of ½ or less of that of the horizontal sides ($h$) and ($h'$), which may be made by extending the vertical sides ($n$) and ($n'$) to have their width of two times or more of that of the horizontal sides ($h$) and ($h'$). These armature coils 101 and 103 are secured so that the vertical sides are fitted to each other by inserting therebetween an electrically insulating material ($e$), thus making the total thickness of the fitted vertical sides just the same as that of the horizontal side.

As will be easily understood from the foregoing description, the present consruction arrangement will never change the current density, since the substantial cross-sectional area of the coil element is not decreased although the thickness of the electromagnetic rail itself is reduced to half of the conventional rail. As a result, the Joule heat will not be increased, so that so remarkable temperature increase in the electromagnetic rail will not occur. Thus, in accordance with the present construction arrangement, the gap between the two poles of the field structure can be made narrower and accordingly the field structure itself can be made smaller and lighter without inviting remarkable temperature increase nor material reduction in the floating force.

In order to obtain a floating force and a driving force sufficient for proceeding a train having a weight of 30 tons per carbody, on the other hand, it is necessary to have the field structure on the train capable of producing a magnetic flux of a density of 8 KG, to make the ampere-turn valve of the armature coil on the ground amount to 80,000 AT, and to pass a high current density of the order of 15 A/mm$^2$ through the armature coil. With such a high current density, the temparature rise is considerable. For example, supposing that a train, 300 m long, runs at a speed of 500 km/hour for 5.7 seconds on a electromagnetic rail, the temperature rise of the armature coil will come close to about 50°C and will amount to as high as about 450°C during the starting operation near stations when a train is on a electromagnetic rail for 45 seconds.

Such excessive temperature rise will greatly degrade or damage electric insulators of the electromagnetic rail or will make the coil conductor greatly deform during the starting operation of the train. Accordingly, it is highly desirable to provide an effective means for dissipating the heat accumulated in the electromagnetic rail. For this purpose, the heat dissipating means includes metal strips which are discosed in a space surrounded by the three sides of the undulating armature coils in a manner to be connected with or in contact with the armature coils for conducting therethrough the heat generated at the conducting portions of the particular coils.

Figure 19:
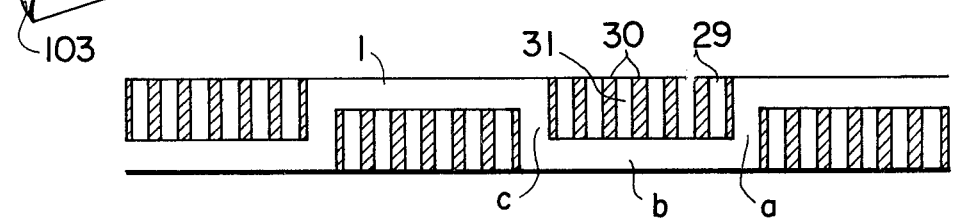
FIGS. 19 and 20 are longitudinal sections showing the arrangement of the cooling metal strips according to the present invention.

More detailed discussion of this means will be made with reference to FIG. 19, in which heat-conductive metal strips 29 and insulators 30 are alternately arranged in the shape of comb teeth in a space 31 surrounded by the three sides $a$, $b$ and $c$ of the undulating armature coil 1.

The metal strips 29 are made of a highly heat-conductive metal such as copper, aluminum or their alloys, and may be made by integrating them with the armature coil conductors 1 (made of copper, aluminum or the like), by making them contact the same, or by securing them to the same by use of a welding method or by means of rivets. The insulators 30 are, on the other hand, made of an insulating material such as a resin or rubber, and are fitted between any two of the adjacent metal strips 29 or filled inbetween under molten condition. These insulators 30 act to insulate and reinforce the metal strips 29, and to prevent the electric current flowing through the armature coil conductor 1 from flowing into the metal strips 29, so as to minimize eddy current loss due to the magnetic flux of the field structure on the train. With respect to the resultant effects of these metal strips, the experiments conducted by us reveal that the present embodiment can have three times as much heat capacity and heat dissipating areas in comparison with the conventional armature coils without such metal strips. With these metal strips, therefore, it has been also found that the temperature rise during the starting operation under the same running conditions is decreased to about 100° C.

Figure 20:
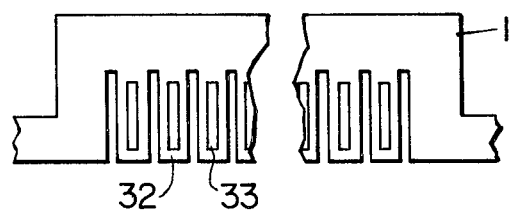

Another but similar embodiment of the heat dessipating means will be described in conjunction with FIG. 20, in which hollow portions 33 are formed in conductors 32 of comb tooth shape. This construction arrangement may also be used in the induction coil of

FIG. 6.

When, it is intended to feed electric current to the electromagnetic rail for the thyristor-controlled linear motor driven train, then a conductor is lead at the feed ends and at the joint portions located at the feed section, and subsequently the lead conductor is connected to the feed line or the connections between the coil conductors are performed. Now considering the thyristor commutated feeding method, the voltage obtainable will be 10 KV to 20 KV, in the case where the length of one electromagnetic feed section is 500 m, the train has 12 cars, each car has four field structures, one coil has a length of 2 m, the number of the divided coils is ten, and the train is running at a speed of 500 km. hour. In order to obtain a required driving force of 3.2 tons per car and a required floating force of 20 tons per car, moreover, it is necessary to pass a current of 10 A/mm² through the coil conductor (in terms of intrisic ampere, or 70,000 to 80,000 AT in terms of ampere-turns, and the temperature rise will amount to 50°C to 80°C for the case in which the time interval of the train in 5 minutes.

In the electromagnetic rail according to the present invention which is subject to high voltage and high temperature rise, connecting portions or terminal portions for the armature coils should be formed at least at the ends of the electromagnetic rail which correspond to one electromagnetic rail feed section. Such connecting portions or terminal portions can stand the above thermal expansion and contraction and the deterioration in efficiency, and can enjoy feasibility in field construction and maintenance of the electromagnetic rail. For this purpose, such structure is proposed in the present invention as has the led-out portion of the undulating coil conductor is moulded into an unitary structure with the main body of the rail at the lower portion of the same.

Figure 21A:
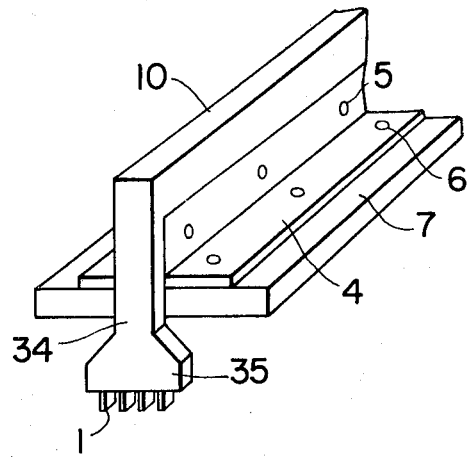
FIG. 21(a) is a perspective view showing the interconnecting end portions of the electromagnetic rail according to the present invention.

Turning now to FIGS. 21a, 21b, 22a, 22b, and the terminal portions will be exemplified in which like reference numerals indicate counterparts of FIG. 5. In FIGS. 21a reference numeral 34 indicates a led-out portion which is moulded into a unitary structure with the electromagnetic rail 10 at its ends. The armature coil conductors 1 are led out, downwardly with their outer surfaces being left covered with the insulating covering, and they are exposed to the outside, at the terminal 35. This lower terminal portion 35 has, as shown, a sufficient extension for affording to the exposed conductors 1 an ample spacing between for standing the high voltages in between conductors.

Figure 21B:
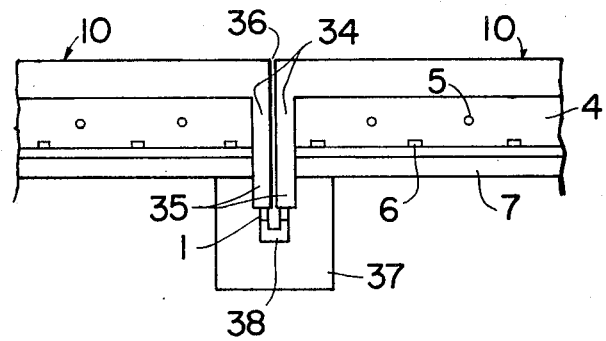
FIG. 21(b) is a diagrammatical view showing the interconnecting portions of FIG. 21(a)

Reference will now be made to FIG. 21(b) in which the led-out portion of (a) is used for providing connection between adjacent electromagnetic rails. The terminal portions 35 are shown to have their portions between the conductors 1 connected with each other with use of a flexible conductor 38, all of which are mounted in a connecting duct 37. The flexible conductor 38 is covered with an insulating material in like manner to the conductors 1. Designated by reference numeral 36 is a clearance which is formed in the connecting portion between the two electromagnetic rails. This clearance 36 will absorb the possible thermal expansion and contraction of the main body of the electromagnetic rails. This construction arrangement should also be appreciated in that, when an accidental damage occurs in the rail main body, the unitary structure formed of the rail of one feed section length and of the led-out portion can be easily replaced by a new one for repair or maintenance.

Figure 22A:
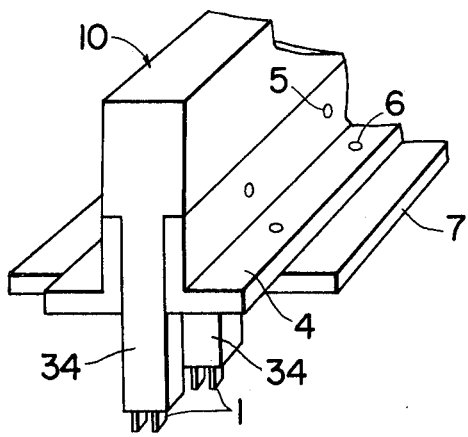
FIGS. 22(a) and 22(b) are respectively similar to FIGS. 21(a) and 21(b) but show a modification of the interconnecting portions.
Figure 22B:
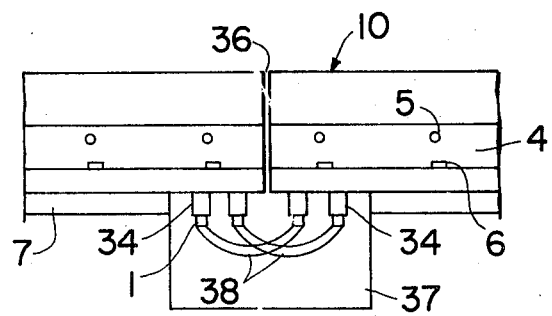

Another but similar embodiment of such arrangement will be described with reference to FIG. 22a and the coil conductors 1 are led out from the two lower ends of the rail main body 10, thus separating into two portions the led-out portions 34 which are moulded into a unitary structure together with the rail main body 10. The manner of connection and covering of the two electromagnetic rails is similar to that of FIGS. 21a and 21b and as such the repeated description together with its resultant effects will be omitted here.

Figure 23:
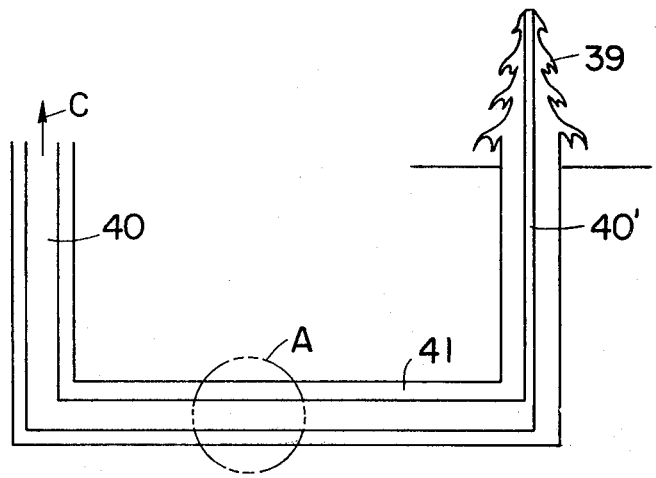
FIG. 23 is similar to FIG. 21(b) but shows another modification.

Turning now to FIG. 23, a similar concept is applied to the terminal portions of the electromagnetic rails. Designated by reference numeral 39 is a terminal bushing which is connected through conductors 40 and 40' and an insulating covering 41 to the electromagnetic rail (not shown) but in the direction of arrow C. Here, the conductor 40 has a rectangular cross section whereas the conductor 40' has a circular shape and is welded the conductor 40. In this instance, it is desirable that the conductors 40 and 40', the insulating covering 41 and the terminal bushing 39 are separated in the area designated at the letter A and that the separated portions are moulded into a unitary structure. These separately moulded portions can be connected later, which makes the construction and manufacture feasible.

Another embodiment of the electromagnetic rail which is facilitated not only in the connecting operation of the coil conductors but also in their inspection and maintenance, will be described with reference to FIG. 24, in which a hollow box-shape support is disclosed. As shown, the support 43 has a shape of hollow box, which is made of concrete or non-magnetic metal, and has a longitudinally extending opening 44 on the upper surface of a predetermined width. At the both sides of the opening 44 are two upright support plates 45 which also extend longitudinally for clamping a moulded coil structure 42 therebetween. When the moulded coil structure 42 is thus clamped by the juxtaposed support plates 45, the joint portion 47 of the coil conductors 1 will depend therefrom into the interior of the hollow rectangular box body 46 through the opening 44. As a result, easy access to the inside of the box body 46 can be obtained for the actual connecting operation of the conductors, for inspection and maintenance of the connecting portion and for replacement of the electromagnetic rails.

Figure 24:
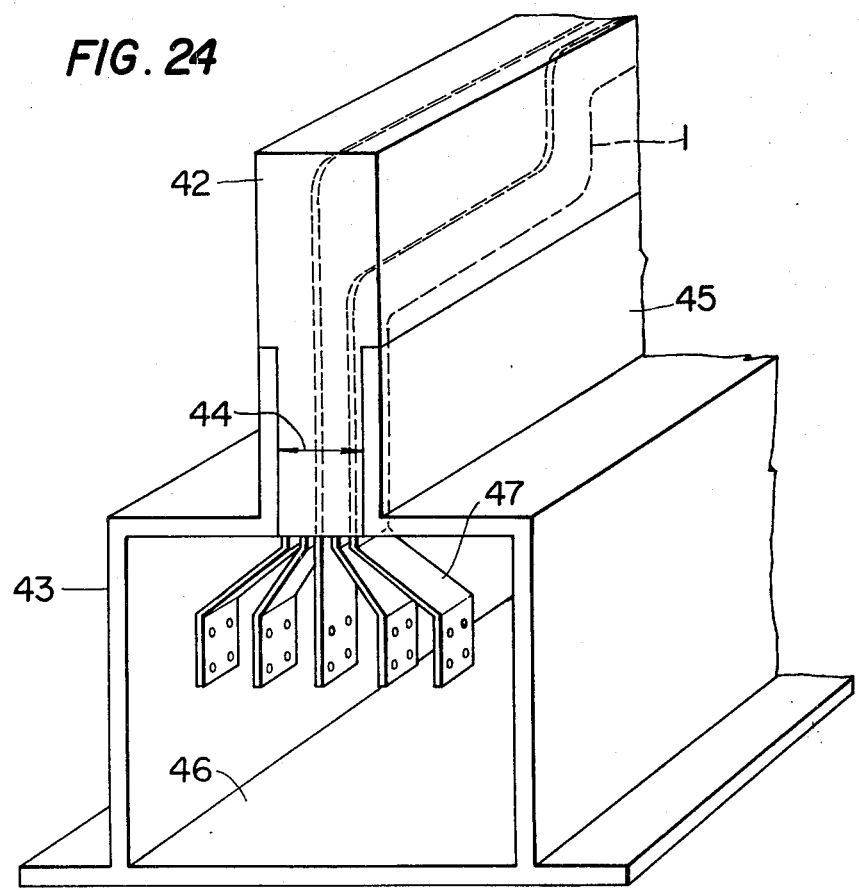
FIG. 24 is similar to FIG. 21(a) but shows still another modification.

Although not only the reactions of the driving and floating forces but also both the transverse forces due to the rolling during straight running of the train and the transverse forces due to the centrifugal forces during curvelinear running of the train will be exerted to the electromagnetic rails, the vertical side walls of the support can offer guide planes to the running train if the support employed is of the type as shown in FIG. 24. This feature will be described with reference to FIG. 25.

Figure 25:
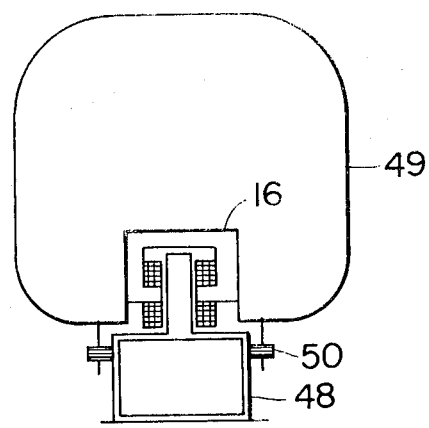
FIG. 25 is a diagramatical view showing overall construction arrangement including the electromagnetic rail of FIG. 24.

In FIG. 25, disgnated by reference numerals 48, 16, 49 and 50 are the electromagnetic rail, the field structure on the train, a car body, and guide rolls mounted on the car body 49, respectively. As will be apparent from FIG. 25, the vertical side walls of the hollow box-shape support can provide satisfactory guide planes for the transverse guide rolls 50. In the hollow rectangular box body 46 of FIG. 24, moreover, necessary coils, feed lines, a variety of communication wires and cooling pipes (not shown) can be accommodated, if desired.

When it is intended to connect the coil conductors of the electromagnetic rails with each other after they are moulded into a unitary structure, the connecting terminals thereof having a predetermined length calculated to obtain a predetermined level of contact resistivity are overlapped and later are fastened with use of the bolts in a like manner as experienced in ordinary bus bar connections. In an alternative method, the connecting terminals are, obliquely cut to abut each other for the subsequent silver-alloy brazing.

Since, on the other hand, the field structure having a predetermined clearance between its pole portions is disposed to stride the electromagnetic rail in the thyristor-controlled linear motor, it is impossible to increase the thickness of the electromagnetic rail over a predetermined value by connecting the coil conductors in the particular rail. Since, moreover, an insulating material is inserted in the space between the two adjoining coil conductors in the electromagnetic rail, such silver-alloy brazing method or the like as requires the step of heating the conductors at a high temperature is not adopted as a suitable method. This is because the excessively heated insulating material will lead to thermal degradation.

Reference will now be made in FIG. 26, in which the pitch of each of the composite coil arrays and the phase interval between the coil turns of the coil arrays are shown when composite coil arrays having an undulation with right angle corners are arranged in ten rows 1 to 10. As shown, the coil array 1 is composed of coil sides 1', 1'', the coil array 2 is composed of coil sides 2', 2'', - - -, and the coil array 10 is composed of coil sides 10', 10'', - - -. Respective coils sides of the ($n/2+$ 1) th coil array are disposed at positions corresponding to the gaps between respective coil sides of the first array. The respective coil arrays are so arranged that their coil planes are made vertical and that the upper or lower horizontal sides are made flush with each other. In the coil arrays, moreover, those coil sides, which have no corresponding sides of the adjacent coil arrays with respect to the perpendicular direction to the coil plane, are shown in FIG. 26 to correspond to the $X$ portions, which are the vertical shorter sides of the respective coil (as shown to have a length of $e$).

Figure 26:
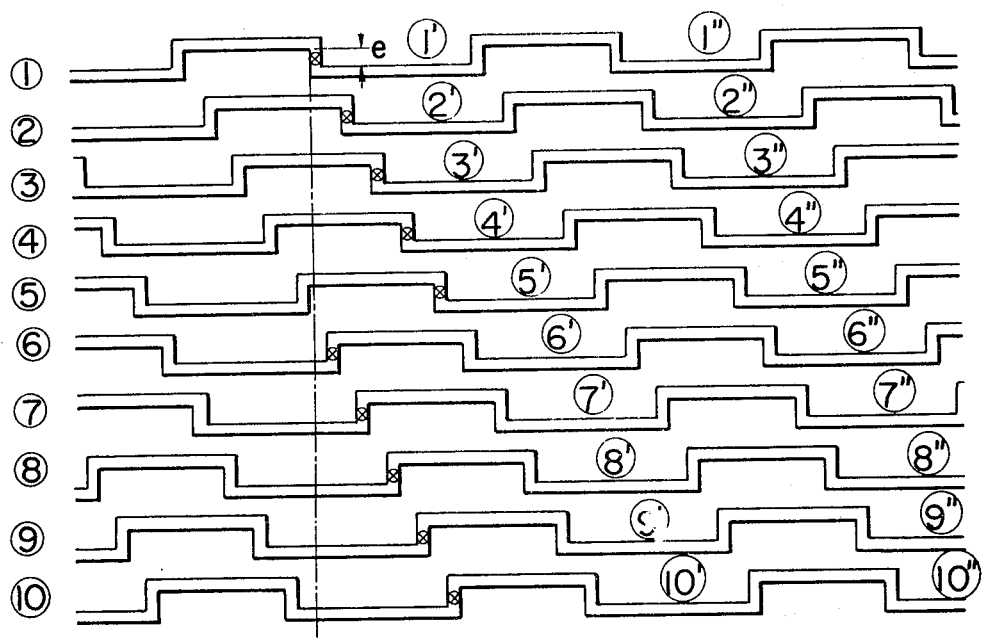
FIG. 26 is similar to FIG. 4 but shows a modification of arrangement of the rectangularly undulating coils.

As will be understood from the above explanation, the inventors, have noticed that the vertical shorter sides of the respective coil turns only can be made free from the spacial restrictions of those of the adjacent coil arrays in such a structure, as shown in FIG. 26. With this in mind, a novel structure can be proposed in which the interconnecting portions of the adjacent coil arrays are located at the particular vertical shorter sides. For this purpose, the interconnecting portions, which overlap one another during the connecting operation, are extended to have a thickness equal to or smaller than ½ thickness of the remaining sides. After that, the particular portions to be joined are interconnected with each other by means of bolts or rivets, which are made of non-magnetic metal, or by another suitable method, such that the effective cross-sectional area of the total interconnected portions can be maintained, thereby ensuring electrical equivalence. Although, moreover, the head portions of the bolts or rivets will resultantly project in the normal direction of the coil planes, the interconnected portions, to which the bolts or rivets are fastened, have no obstacles such as the coil side of another coil array in the above direction. This construction arrangement will afford sufficient space for the head portions, which should be appreciated in that the shop or field connection can be facilitated remarkably.

Such advantageous connecting method will be detailed in the following with reference to FIGS. 27 to 29.

Figure 27B:
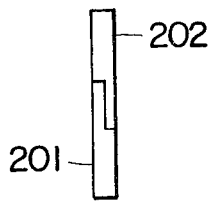
FIG. 27(b) is a section taken along the line X — X of FIG. 27(a)
Figure 27A:
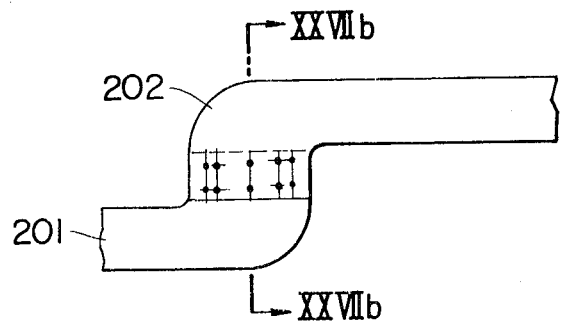
FIG. 27(a) is a side elevation showing the connecting portions of the armature coils.

Turning first to FIG. 27, the terminal ends of a coil array 201 at the vertical shorter side is extended to have a thickness equal to or smaller than that of the remaining side of the coil 201. This extension is also applied to the other coil array 202, and then it is overlaid to the coil array 201 for creation of the joint. As will be apparent from FIG. 27, therefore, the coil conductor has uniform thickness and height even at the interconnected portion.

Figure 28:
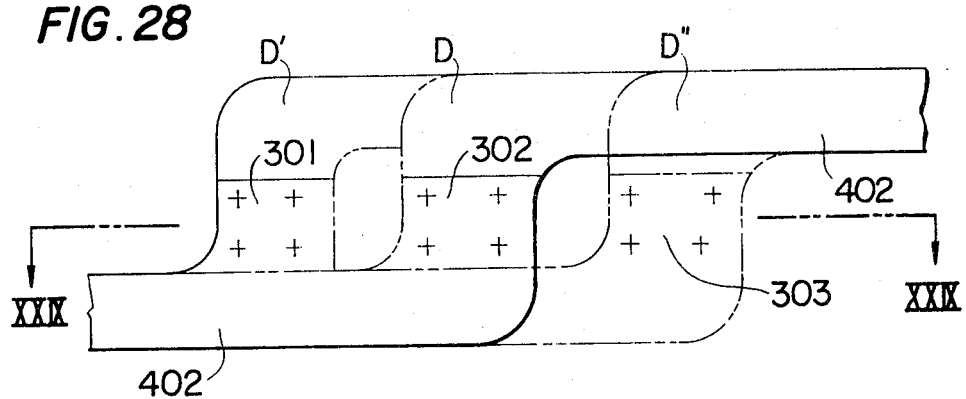
FIG. 28 is a side elevation showing three rows of the armature coils having the connecting portions of FIGS. 27(a) and 27(b)

As seen from FIG. 28, the coils D, D' and D'' having the interconnected portions thus constructed have their vertical shorter sided 301, 302 and 303 freely accessible from the outside without being interferred with those of the adjacent coils D', D and D''. Thus, the interconnecting operation can be remarkably simpliified.

Figure 29:
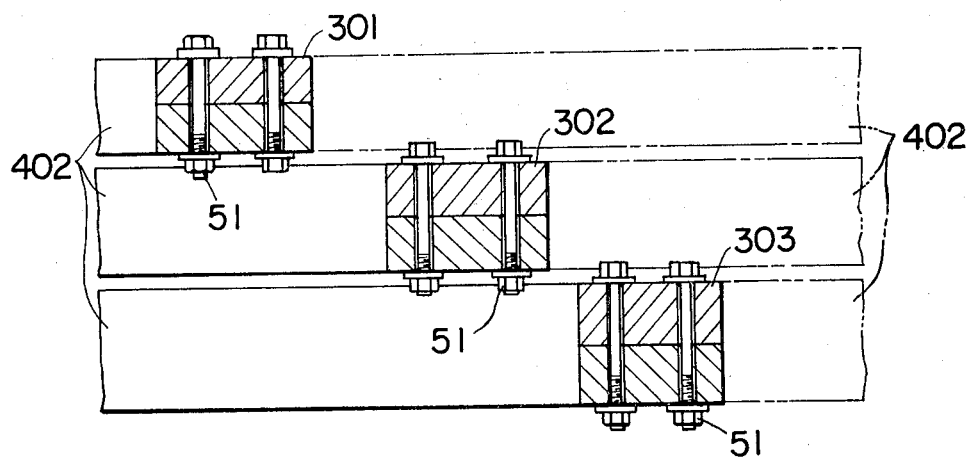
FIG. 29 is a section taken along the line Y — Y of FIG. 28.

As shown in FIG. 29, when it is intended for fastening of the vertical shorter side 302, the projection of the head portion of the bolt 51 will never be obstructed by the vertical shorter sides 301 and 303 of the adjacent coils D' and D'' and the horizontal sides 402.

As has been described in the beforehand, generation of high voltage and high temperature rise are inevitable in the electromagnetic rail for use in a thyristor-controlled linear motor driven train. In order to obviate the above difficulties, the present invention proposes that the armature coil conductor is imbedded in a resilient semiconductive layer extending in the longitudinal direction, and that both are covered with an insulating covering. More specifically, a resilient semiconductive layer made of ethylene propylene rubber (EP rubber) including carbon or the like is interposed between the coil conductor and the insulating covering, so that the strongly distorted electric field due to the existence of the corner and outer roughness of the conductor can be alleviated to improve insulating efficiency required, to absorb the thermal stress caused by the high temperature rise, and at the same time to prevent formation of air voids which might cause the corona discharge coming from the difference in thermal expansion and contraction between the conductor and the insulating covering when the conductor is adiabatically expanded under heat shock phenomenon due to the high temperature rise. Thanks to the existence of the above semiconductive layer, therefore, the present electromagnetic rail should be appreciated in terms of the improved insulating efficiency and resistivity to deterioration of insulation, and in the effective prevention of deformation of the coil due to the thermal expansion and contraction and of breakage of the outer surface of the coil conductor. This concept will now be described with reference to FIGS. 30 and 31.

Figure 30:
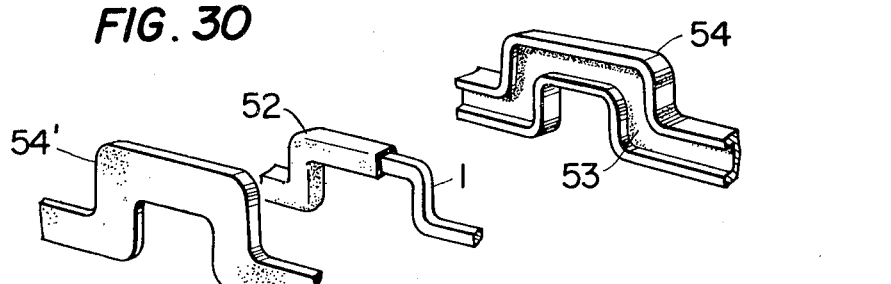
FIG. 30 is a perspective view showing a turn of the undulating armature coil of the present invention in an exploded fashion.
Figure 31:
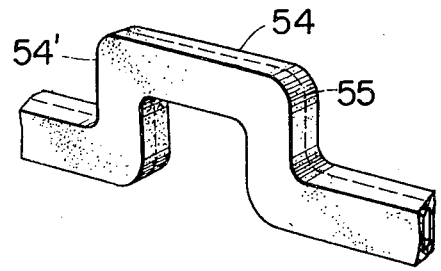
FIG. 31 is a perspective view showing the turn of the undulating armature coil of FIG. 30 when it is assembled.

As shown in FIG. 30, the undulating armature coil conductor 1 is first covered with a semiconductive layer 52, and then inserted into an undulating insulating covering 54. This covering 54 is first divided into two halves, each of which is formed with a groove 53. These two halves 54 and 54' are then joined to each other enclose the coil conductor 1 covered with the semeiconductive layer 52. More specifically, the coil conductor 1 is made of a fine metal wire, which is bent to form a predetermined number of undulations, or of a metal plate which is punched out to form similar undulations. The coil conductor 1 as thus formed is uniformly coated with a semiconductive material such as resin composite or rubber composite containing graphite. Thus, the semiconductive layer 52 is formed on the coil conductor 1. The two halves 54 and 54' are formed with the grooves 53 which are sized to receive therein the coated coil conductor 1. These covering halves 54 and 54' are made of a suitable thermo-setting resin such as epoxy resin. Then, the coated coil conductor 1 is fitted in the two halves 54 and 54' in a manner as shown in FIG. 31, and subsequently the joint portion 55 is formed by adhering the two halves 54 and 54' to each other with use of suitable adhesive.

The electromagnetic rail according to the present invention should be appreciated in the following points:

1. Since the thickness of the insulating covering or layer may have a large value, the resultant rail can stand high voltage;

2. The insulation of the bent portion can be relied remarkably just the same as that of the flat portion;

3. Since the clearance between the insulating covering and the coil conductor is filled with the semiconductive composite, the corona discharge, which will often take place in the particular clearance, can be eliminated; and 4. Thanks to implified construction, the present elecrromagnetic rail is suitable for mass production.

As has been described in detail in the above, the electromagnetic rail according to the present invention can be used as a rail for a thyristor-controlled linear motor driven train which can run at an ultra high speed exceeding 300 km/hour with sufficient safety. It should, however, be understood that the present electromagnetic rail should not be limited to the ultra high speed train but can find a variety of applications including a vehicle which runs at a speed less than 300 km/hour.

What is claimed is:

1. In an electromagnetic rail for driving a train by a thyristor-controlled linear motor including a field structure mounted on the train and an armature coil fixed relative to the ground and juxtaposed to said field structure for imparting a driving force and/or a floating force to the train through said field structure when an electric current flowing through said armature coil is commutated by the thyristor, the improvement wherein: said electromagnetic rail comprises an armature coil assembly consisting on N pairs of undulating coil arrays, the coil sides of which contributes a driving force and/or a floating force to the train and one coil array of each pair is displaced one coil pitch interval from the other coil array of said pair, said pairs are displaced at 1/N coil pitch intervals from one another, an insulator covers said coil arrays and is molded integrally with said coil arrays into a unitary plate-form body, and wherein a support supports said molded and insulated armature coil arrays in such a manner that the current loops of the currents flowing in said coil arrays are vertical to the ground.

2. An electromagnetic rail according to claim 1, wherein said armature coil assembly further comprises a linear conductor for merely contributing to the floating force, juxtaposed to said undulating coil arrays.

3. An electromagnetic rail according to claim 1, wherein said armature coil assembly comprises at least one longitudinal row of two undulating composite coil arrays respectively acting as a supply passage and as a return passage and juxtaposed at one-coil-pitch intervals from each other.

4. An electromagnetic rail according to claim 1, wherein said electromagnetic rail comprises two rail units each including same number of undulating composite coil arrays and laid down on the ground in parallel with each other and wherein the composite coil arrays of one of said two rail units act as a supply passage and the composite coil arrays of the other act as a return passage.

5. An electromagnetic rail according to claim 1, wherein said composite coil arrays are arranged symmetrically with respect to the longitudinal direction.

6. An electromagnetic rail according to claim 1, wherein said armature coil assembly further comprises a metal strip of heat conductivity disposed in a space, defined by the three sides of said undulating composite coil arrays and being in contact with coil sides for conducting therethrough heat generated in said composite coil arrays.

7. An electromagnetic rail according to claim 1, wherein said armature coil assembly further comprises a led-out portion integrally moulded with the main body of said electromagnetic rail at the lower ends of said rail.

8. An electromagnetic rail according to claim 1, wherein said support comprises a hollow rectangular box body formed with a longitudinal opening of a predetermined width, and two support plates extend upright from the edges of said opening are juxtaposed to each other and clamped in between the armature coil structure such that the joint portion of said armature coil is suspended into the interior of said hollow rectangular box body through said opening.

9. An electromagnetic rail according to claim 1, wherein said armature coil assembly further comprises a longitudinal semiconductive layer coated on each of said armature coil arrays and an insulating covering enclosing said armature coil arrays and said semiconductive layer.

10. An electromagnetic rail according to claim 9, wherein said insulating covering includes two undulating halves formed with grooves which are sized to receive therein said armature coil arrays together with said semiconductive layer when they are joined to each other.

11. An electromagnetic rail according to claim 1, wherein said armature coil assembly further comprises an induction coil made of a rectangular short circuited coil disposed in a lower space, which is surrounded by the three sides of said composite coil array, and wherein said composite coil arrays are moulded together with said induction coil into a unitary armature coil structure.

12. In an electromagnetic rail for driving a train by a thyristor-controlled linear motor including a field structure mounted on the train and an armature coil fixed relative to the ground and juxtaposed to said field structure for imparting a driving force and/or a floating force to the train through said field structure when an electric current flowing through said armature coil is commutated by the thyristor, the improvement wherein: said electromagnetic rail comprises an armature coil assembly consisting on N pairs of undulating coil arrays, the coil sides of which contributes a driving force and/or a floating force to the train and one coil array of each pair is displaced one coil pitch interval from the other coil array of said pair, said pairs are displaced at 1/N coil pitch intervals from one another, an insulator covers said coil arrays and is molded integrally with said coil arrays into a unitary plate-form body, and wherein a support supports said molded and insulated armature coil arrays in such a manner that the current loops of the currents flowing in said coil arrays are vertical to the ground and wherein said armature coil assembly comprises a plurality of composite coil arrays each including two rows of undulating coils, juxtaposed at a one-coil-pitch interval from each other and which have their vertical sides extended to have a thickness no greater than ½ of that of their horizontal sides and being overlapped one on the other but separated by an insulator therebetween.

13. In an electromagnetic rail for driving a train by a thyristor-controlled linear motor including a field structure mounted on the train and an armature coil fixed relative to the ground and juxtaposed to said field structure for imparting a driving force and/or a floating force to the train through said field structure when an electric current flowing through said armature coil is commutated by the thyristor, the improvement wherein: said electromagnetic rail comprises an armature coil assembly consisting of N pairs of undulating coil arrays, the coil sides of which contributes a driving force and/or a floating force to the train and one coil array of each pair is displaced one coil pitch interval from the other coil array of said pair, said pairs are displaced at 1/N coil pitch intervals from one another, an insulator covers said coil arrays and is molded integrally with said coil arrays into a unitary plate-form body, a support supports said molded and insulated armature coil arrays in such a manner that the current loops of the currents flowing in said coil arrays are vertical to the ground and wherein said armature coil arrays have undulations such that their interconnecting portions are located at the vertical sides thereof, which are extended to have a thickness no greater than ½ of that of the remaining sides and which are overlapped one on the other for electrical connection.

* * * * *